UNITED STATES PATENT OFFICE.

CHARLES E. HITE, OF BURLINGTON, NEW JERSEY, ASSIGNOR OF ONE-HALF TO WALTER PINCUS, OF PHILADELPHIA, PENNSYLVANIA.

SULFUR COMPOUND AND PROCESS OF MAKING.

1,068,769.  Specification of Letters Patent. Patented July 29, 1913.

No Drawing.  Application filed September 24, 1910. Serial No. 583,591.

*To all whom it may concern:*

Be it known that I, CHARLES E. HITE, a citizen of the United States, residing at Burlington, in the county of Burlington and State of New Jersey, have invented a new and useful Sulfur Compound and Process of Making, of which the following is a specification.

My invention relates to an improved sulfur compound and the process of making same.

The object is to produce an improved compound of sulfur which shall be readily soluble in water. The improved compound contains a maximum amount of free or uncombined soluble sulfur with a minimum amount of caustic alkali, in the form of crystals, or a powder. The entire compound is completely soluble in water.

The process of making the compound is as follows:—To ten pounds, for example, of flowers of sulfur or crude sulfur, preferably pulverized, is added a substantially equal weight of caustic soda. These two ingredients are thoroughly mixed in the dry state. The mixture is now gently heated from an external source, and stirred; the sulfur begins to melt and water is liberated. The temperature to which the mixture is subjected is about 212° F., as the water is evaporated the temperature rises. By the addition to this mixture of about one-half ounce of water, preferably boiling, just before heating the mixture, the rapidity of the chemical action is facilitated. The chemical action starts immediately. The mass is gently stirred while the action is going on. And the external heat is now reduced or withdrawn entirely to prevent excessive chemical action and waste of sulfur by vaporization. There is, due to the heat generated by the reaction a temperature sufficient to evaporate part of the water liberated, without burning the sulfur, which may yet be uncombined, or the compounds formed or forming. The heat generated by the reaction is not sufficient however to complete the process. As the mass starts to cool rapidly, before the chemical action has been completed, it is necessary, in order to complete the chemical action, that the mass be again heated from an external source, stirring the mass continuously in order to liberate the steam and not vaporize the sulfur excessively, which would cause undue loss of sulfur. When the chemical action is completed, there results on cooling, a powdered compound, which is soluble in water.

The actual analysis of a compound made in substantial accordance with the above described method, except that slightly more water was used, gave the following result—

| | |
|---|---|
| Water of combination | 14.55% |
| Moisture | 0.29% |
| Insoluble matter | 0.13% |
| Sodium sulfite | 8.38% |
| Sodium sulfid $Na_2S$ | 28.47% |
| Sodium thiosulfate | 10.82% |
| Sodium hydroxid | 0.40% |
| Free sulfur which is soluble in water | 36.98% |

It has been found in practice that additional heat, beyond the heat generated by the reaction, is necessary, in order to continue and complete the chemical action, making a powdered or crystal compound substantially as described. In making this product in large quantities, steam heated receptacles are used with satisfactory results. The time during which the artificial heat is necessary in the completion of the chemical reaction depends upon the mass of material to be acted upon. This compound or product, has been proven in practice to be substantially free from caustic alkali, so that the compound is suitable, even in a concentrated form, when dissolved in water, for external applications upon the skin without burning or causing undue irritation. It is also suitable for spraying delicate plants without injury to same.

It has been well known in the art of chemistry that sulfur and a caustic alkali can be mixed with water producing a chemical reaction and liberating a certain amount of heat. The amount of caustic alkali remaining in such a mixture renders it unfit for many uses, or else there is sulfur remaining in the compound, which is not soluble in water. This compound of free sulfur produced by my method contains a large percentage of sulfur, which is not combined with sodium in any form, and which is soluble in water, namely about 36.98% as indicated in the above analysis. This compound can be used in the concentrated or crystallized state, or can be diluted to any extent with water. This compound may obviously be utilized in connection with other substances in the product or manufacture of medicines, lotions, soaps, salves or the like.

What I claim is:—

1. The process which consists in mixing together approximately equal quantities by weight of powdered sulfur and caustic soda, subjecting the mixture to a temperature sufficiently high to evaporate a portion of the water, but not high enough to vaporize any considerable amount of the sulfur, and maintaining the mixture at the required temperature until the chemical action is completed, utilizing the moisture formed.

2. The process which consists in first mixing together in the dry state substantially equal weights of caustic soda and powdered sulfur, then, in order to facilitate the operation, adding to the mixture just sufficient water to hasten a chemical action therein, and subjecting the same to a temperature sufficiently high to evaporate a portion of the water, but not high enough to vaporize any considerable amount of the sulfur to continue and complete the chemical action, stirring said mixture meanwhile until the caustic soda has been practically all combined, thereby forming sodium compounds, and rendering a certain percentage of the total sulfur, which is uncombined with sodium, soluble in water.

3. A product resulting from a mixture of substantially equal parts by weight, of sulfur and caustic soda, subjected to a temperature sufficiently high to evaporate a portion of the water, but not high enough to vaporize any considerable amount of the sulfur, in which the caustic alkali is practically all combined with a portion of the sulfur, the balance of the sulfur uncombined with sodium, and the compound, including the uncombined sulfur, soluble in water.

4. A product resulting from a mixture of substantially equal parts by weight, of sulfur and caustic soda, subjected to a temperature sufficiently high to evaporate a portion of the water, but not high enough to vaporize any considerable amount of the sulfur, which compound contains practically no uncombined alkali and approximately 36.98% of free sulfur uncombined with sodium and soluble in water, substantially as per analysis given.

CHARLES E. HITE.

Witnesses:
MAE HOFMANN,
HOWARD S. OKIE.

---

Copies of this patent may be obtained for five cents each, by addressing the "Commissioner of Patents Washington, D. C."